R. PÖTHIG.
CALCULATING MACHINE.
APPLICATION FILED APR. 1, 1911.
1,085,480.
Patented Jan. 27, 1914.
3 SHEETS—SHEET 1.
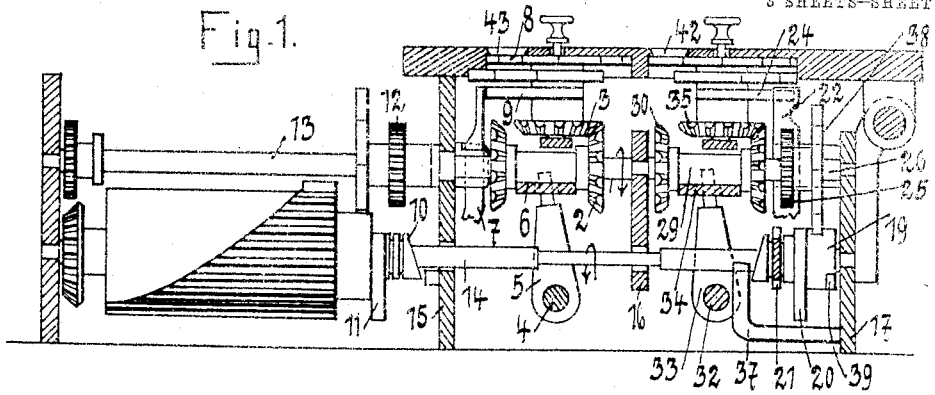
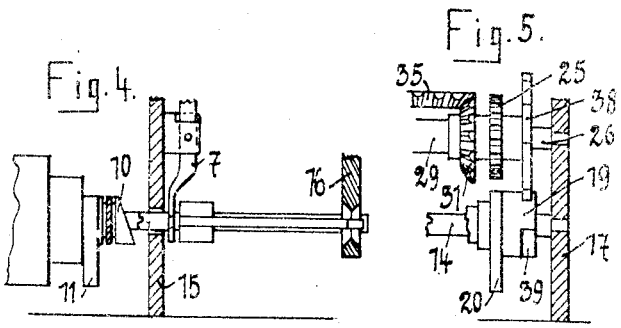
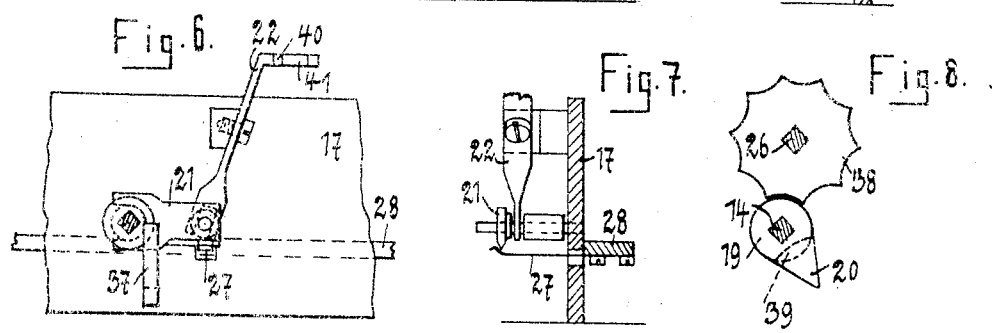
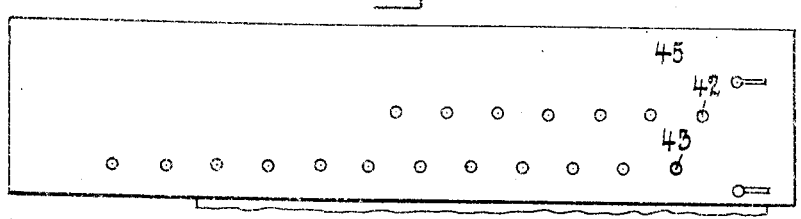

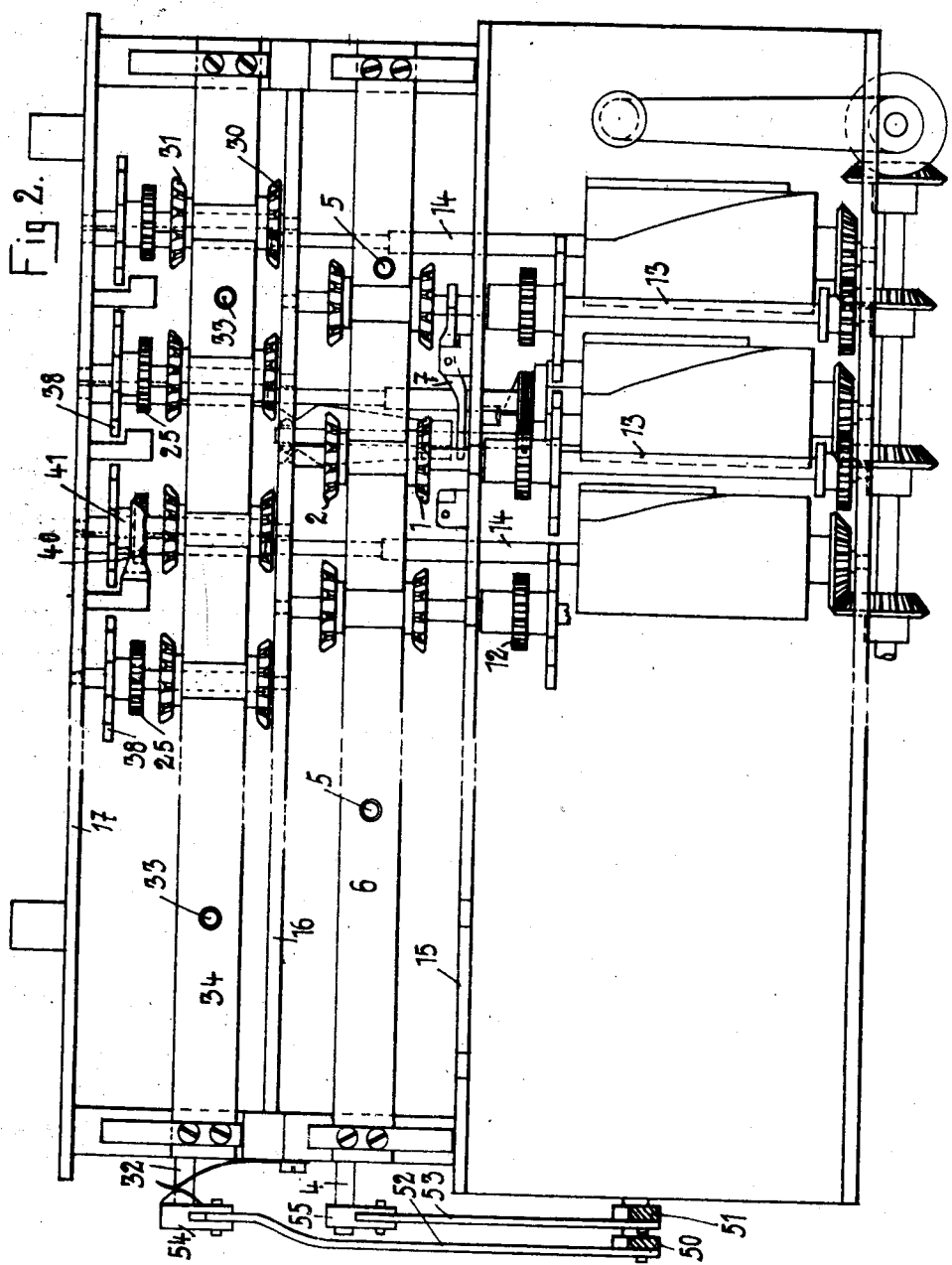

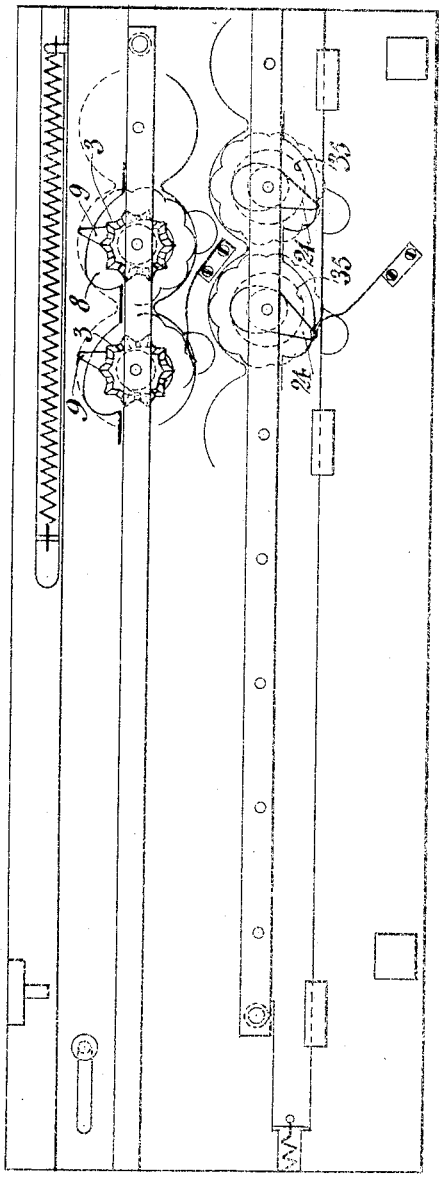

UNITED STATES PATENT OFFICE.

REINHOLD PÖTHIG, OF GLASHÜTTE, GERMANY.

CALCULATING-MACHINE.

1,085,480.  Specification of Letters Patent.  Patented Jan. 27, 1914.

Application filed April 1, 1911. Serial No. 618,454.

*To all whom it may concern:*

Be it known that I, REINHOLD PÖTHIG, a subject of the King of Saxony, Empire of Germany, and a resident of Glashütte, in Saxony, Germany, have invented certain new and useful Improvements in Calculating-Machines, of which the following is a specification.

This invention relates to certain improvements in the well-known Thomas calculating machine whereby the said machine is provided with additional tens-shifting sleeves at the rear of the regular counters for coöperating with the parts of the quotient-counters and adapt the calculating machine in a comparatively simple and inexpensive manner for the easier use of the same in multiplication, division and other arithmetical operations.

It has been proposed heretofore for calculating machines other than the Thomas machine, to transform the quotient-counter which is composed of dials independently of each other, by the addition of tens-shifting devices into a regular counter which not only indicates the number of rotations of the crank at any desired point, but which also indicates as the end-result of the different single operations the real quotient even when addition or subtraction should have been alternately performed. This is especially useful when applied to the so-called simplified computations.

For this purpose the invention consists of a Thomas calculating machine in which the shafts of the change-gear shifting devices are extended rearwardly beyond the product-counters and provided with additional tens-shifting sleeves which coöperate with the different parts of the quotient-counters which are located in the well-known manner sidewise of the product-counters. It is, however, not new in Thomas calculating machines with two counters to extend the shafts of the shifting change-gears toward the rear and provide them with tens-shifting sleeves for a second counter. But in this construction of the Thomas calculating machine both counters serve solely for indicating the products while the improvements described in this application are confined solely to Thomas-machines with quotient-counters.

The improved machine will be fully described hereinafter and the new features then pointed out in the claim.

In the accompanying drawings which show the improved quotient-counters for Thomas calculating machines, and in which similar letters of reference indicate corresponding parts, Figure 1 represents a vertical transverse section of the improved calculating machine, Fig. 2, a plan-view in which the ruler and adjusting top-plate are omitted, Fig. 3, a bottom-view of the ruler, Figs. 4 to 8 details, which will be specially referred to later on, of different operating parts, and Fig. 9 a diagrammatic plan-view of the calculating machine, drawn on a reduced scale.

The actuating gear wheel mechanism for the product-counters consists in the well-known manner of two bevel-gearwheels 1 and 2, which are located at the ends of a common longitudinally-shiftable sleeve and of a third bevel-wheel 3 which is supported on the top-plate and adapted to be alternately placed in mesh with the bevel-gear-wheels 1 and 2. The shifting of the bevel-gearwheels 1 and 2 is accomplished from a longitudinal shaft 4, which is supported in the upright walls of the machine-frame, by means of arms 5 which are firmly mounted on the shaft 4 and connected at their upper ends with holes in a longitudinally-shiftable horizontal rail 6 which is connected with all the shifting sleeves of the bevel-gearwheels 1 and 2. The tens-shifting is produced by the well-known tens-finger 7 which at the completion of one full rotation of the shaft of the dial 8 is pressed sidewise by a finger 9 so as to produce the shifting of the sleeve 10 with the shifting-finger 11 and place the same into engagement with the shifting wheel 12 on the shaft 13 of the counter.

The special improvement on the Thomas machine consists in extending all the axles 14 of the shifting devices in rearward direction and support them in the outer walls 15 and 17 and the intermediate wall 16. At the rear-end of each shaft 14 is arranged a shiftable sleeve 19 which is capable of longitudinal motion on the shaft but splined thereto so as to prevent any axially-shifting motion. The sleeve 19 carries a shifting finger 20 and is embraced by the forked end of a lever 21 which is actuated by the shifting-lever 22, said lever being fulcrumed to the rear-wall 17, as shown in Fig. 7, the upper end of which, at the completion of every full rotation of the vertical shaft of the dial 23 of the quotient-counter, is oscillated by a finger 24 which is mounted on the shaft for actuating the upper end of the shifting-lever 22. By this actuation of the shifting lever 22 the finger 20 located on the sleeve 19 is shifted with said sleeve so that the finger is placed in line with a gear-wheel 25 which is located on the shaft 26 of the quotient-counter. In this position the sleeve 19 is rigidly held by a flat spring 27, which, as shown in Fig. 7, presses on the pointed lower end of the forked lever 21 at one or the other side of the same. The spring 27 is attached to a horizontal rail 28 which is located on the outside of the rear-wall 17, said spring extending through an opening in the wall 17, inwardly toward the forked lever 21. On the shaft 26 is located a sleeve 29 provided with two bevel-gearwheels 30 and 31, which are exactly of the same size as the corresponding bevel-gearwheels of the product-counting device. The sleeve 29 is operated from a longitudinal shaft 32 by means of intermediate arms 33 which latter engage a longitudinal rail 34 that is placed in connection with all the sleeves 29 and the quotient-counting device. The bevel-gear-wheels 30 and 31 are alternately placed in mesh with a bevel-gearwheel 35 which is located on the shaft of the dial 23. After the tens-shifting device has been operated, the sleeve 19 is returned into a position of rest by bringing a wedge-shaped cam 36 located at the end of the same alongside of the forked lever 21 into contact with an angular arm 37, the lower end of which is attached to the rear-wall 17. To prevent any over-turning of the shaft 26, a star-wheel 38 located on the same is placed by its concave portions in contact with the hub of the sleeve 19 until a concave portion 39 on the sleeve permits, after the shifting of the same, the passing of the points of the star-wheel and thereby the axial rotation of the shaft 26.

From the foregoing it can be readily seen that the tenth-shifting, in one or the opposite sense, can be obtained in the quotient-counting device. The sleeve 19 on the shaft 14 of the first shifting device, as shown in Fig. 5, is non-shiftable and so arranged on the shaft that its shifting-finger 20 can always be placed into engagement with the gearwheel 25, inasmuch as by the shaft of the shifting-device all the turns of the crank are transmitted to the quotient-counting device by a corresponding shifting of the ruler of the calculating machine in the well-known manner. Special stress, however, has to be placed on the formation of the upper end of the shifting-lever 22 which is provided with an indentation 40 and a beveled end 41, as shown in Figs. 2 and 6. The indentation 40 and the beveled end 41 limit a guide-portion which is located between them and along which the finger 24 has to glide when the tens-shifting device is called into action. The finger 24 glides along the inclined portion of the indentation 40 and along the beveled end 41, of which the former is used for engaging the finger for addition and the other for engaging the finger for subtraction, said finger pressing thereby the lever 22 backwardly until the finger arrives on the guide-portion between the indentation 40 and end 41.

By providing the quotient-counting device with a tens-shifting device, it is necessary to place the quotient-counter to the rear of the product-counting device. This requires that the peep-holes for the product-counters 42 of the quotient-counting device have to be located to the rear and intermediately of the peep-holes of the product-counting device, as shown in Figs. 1 and 9.

The shifting motion which has to be imparted to the rails 6 and 34 for the purpose of placing the change-gearwheels into proper position, two hand-levers 50 and 51 are arranged at one side of the machine, which are connected at their ends by rods 53 and with cranks 54 and 55, so that for each quotient-counter a special hand-lever is provided which can be separated from the hand-lever for the product-counter, while on the other hand a coupling device between the two is provided in such a manner that both hand-levers are jointly adjustable.

A special hand-lever for the shifting of the quotient-counter permits the possibility of a special control by the quotient-counter as regards the computations made by the machine. For instance, when for making subtractions, the hand-lever 51 is placed on subtraction and the product-counter set for a given number, then the hand-lever 50 of the quotient-counter can remain on addition, so that the correct number of rotations of the crank appears on the quotient-counter whereby it is possible to determine immediately how many different items were deducted from the starting number for which the product-counter has been set. When, however, the hand-lever 50 has been shifted to subtraction then the quotient-counter would respond to subtraction and a number would therefore appear which would not give directly the numbers of the different subtracted items but would require a supplementary calculation. Furthermore, the special adjustability of the change-gears of the quotient-counter is important for division. It is true that it is possible to carry out division by means of multiplication when both hand-levers are jointly shifted. But when for instance the number 144 is to be divided by 12, it can be accomplished in such a manner that the adjusting plate is set for the number 12, after which as many rotations of the crank are made until on the product-counter the number 144 appears. But when this computation is desired to be made in the ordinary way, by which the number 144 is set on the product-counter from the start, and the adjusting plate for the number 12, then it is necessary to set the lever 51 of the product-counter to subtraction while the hand-lever of the quotient-counter remains on addition. Only in this manner the quotient-counter will indicate that for this mode of carrying out division twelve crank-rotations have to be made. When the hand-lever of the quotient-counter would be placed likewise on subtraction, then the quotient-counter would be operated for subtraction and this would require a supplementary computation for obtaining the proper result.

I claim:

In a Thomas calculating machine having an extension of the shaft of the change-gear, the combination, with the product-counter and a quotient-counter arranged to the rear of the product-counter, of a tens-shifting sleeve arranged on the extension of the shaft of the change-gear in such a manner that they coöperate with the corresponding parts of the quotient-counter.

In testimony, that I claim the foregoing as my invention, I have signed my name in presence of two subscribing witnesses.

REINHOLD PÖTHIG.

Witnesses:
OTTO WOLFF,
C. S. HUGO DUMMEY.